E. W. JOHNSON.
Middlings-Purifiers.
No. 158,418.
Patented Jan. 5, 1875.
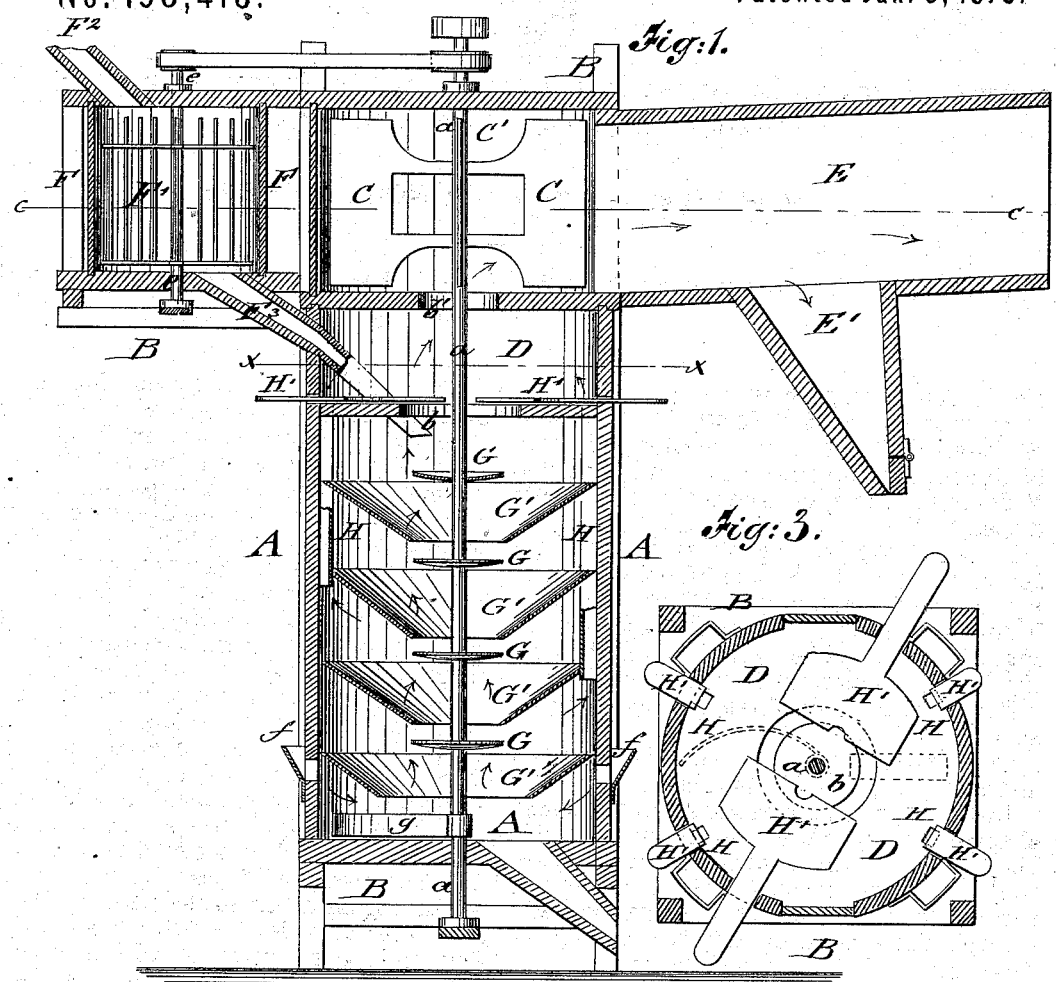
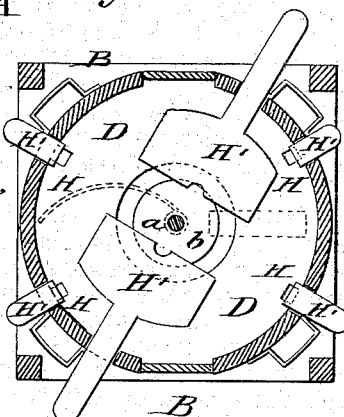
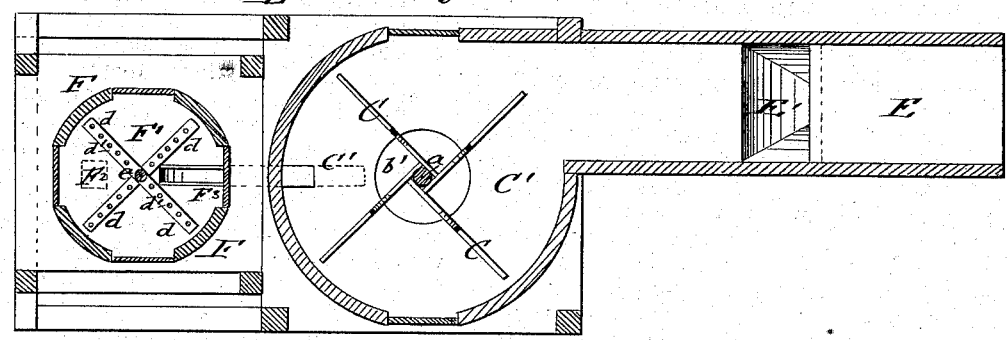

UNITED STATES PATENT OFFICE.

EDWIN W. JOHNSON, OF FORESTON, ILLINOIS, ASSIGNOR TO HIMSELF AND JOSEPH U. KNODLE, OF SAME PLACE.

IMPROVEMENT IN MIDDLINGS-PURIFIERS.

Specification forming part of Letters Patent No. 158,418, dated January 5, 1875; application filed October 10, 1874.

*To all whom it may concern:*

Be it known that I, EDWIN W. JOHNSON, of Foreston, in the county of Ogle and State of Illinois, have invented a new and Improved Middlings-Purifier, of which the following is a specification:

In the accompanying drawings, Figure I represents a vertical longitudinal section of my improved middlings-purifier; Fig. 2, a horizontal section of the same on the line $c\ c$, Fig. 1, and Fig. 3 a horizontal section through the valve-chamber, taken on line $x\ x$, Fig. 1.

Similar letters of reference indicate corresponding parts.

The invention will first be fully described and then pointed out in the claim.

In the drawing, A represents the separating-chamber, of cylindrical shape and suitable height, above which is supported, on a suitable frame, B, the fan-casing C, with the revolving suction-fan $c$, whose shaft $a$ passes centrally through the separating-chamber, turning in bearings $a'$ of the top and bottom part of frame B. Intermediately between the upper part of separating-chamber A and fan C is arranged the valve-chamber D, which communicates, by a central aperture, $b$, of suitable size, with chamber A, and by a central aperture, $b'$, with the fan-casing for conducting the impurities through the fan-casing, and a discharge-conductor, E, for the lighter, and a bottom-spout, E', for the heavier, particles, to suitable collecting-receptacles. A cylindrical casing, F, at the top part of frame A, opposite to conductor E, contains the revolving beater or whipper F¹, which is constructed of radial arms with vertical stirrer or whipper-rods $d'$ attached to the vertical shaft $e$ of the whipper, to which motion is imparted by belt and pulley, in like manner as to the fan-shaft, from the motive power of the mill. An entrance-spout, F², at the top of casing F, feeds the meal to the action of the whipper for the purpose of being thoroughly stirred or loosened, to be conveyed in comminuted state, without lumps or adhering parts, to the bottom spout F³. The bottom spout F³ passes through the valve-chamber D to the top part of the separating-chamber A, discharging the meal onto the uppermost saucer G of fan-shaft $a$. A series of saucers, G, are firmly applied at equal distances to shaft $a$, and serve to throw, by the centrifugal power imparted by the revolving fan-shaft, the meal toward inverted conical funnels G', of which a corresponding number are arranged below the saucers, and applied stationary to the inner wall of the separating-chamber. The discharge-opening of each funnel G' is nearly equal to the size of saucer G, so that the meal particles spread by the uppermost saucer are gathered by its funnel and conducted to the next saucer, to be there again thrown out and collected, and so on. The meal is acted upon by the continual spreading out, as produced by the saucers with great facility, by the strong upward current of air, caused by the suction-fan through the side apertures $f$, near the bottom of the separating-chamber, so that thereby the bran and other impurities are separated from the flour and carried partly around the saucers, by the central apertures of the valve-chamber and fan-casing, to the discharge-conductor and partly through a suitable number of side channels or conductors, H, at the inner circumference of the separating-chamber A, to the valve-chamber and the exit-conductor.

The side channels are of different heights, connecting the separate funnels directly with the valve-chamber. The central aperture of the valve-chamber, as well as the mouths of the side channels, may be opened and closed by sliding valves H', which are adjusted from the outside, to regulate the force of the current in connection with the quantity of meal supplied from the whipper. The lighter particles are thus completely and effectively separated from the flour, which settles finally on the bottom of the separator, and is swept by a rotating arm, $g$, of the fan-shaft to the discharge-spout, and conveyed to suitable receiving-receptacles. Thus, a very powerful, rapidly-working, and effective middlings-purifier is furnished, which performs the separation of the impurities in very satisfactory manner, and furnishes a superior and soft flour.

Having thus described my invention, what I claim as new, and desire to secure by Letters Patent, is—

The combination of a superposed suction-fan, C, whose case has the side conductor E and bottom hole $b'$, with the subjacent chambers D A, the former having meal-inlet spout $F^3$ and central aperture $b$, while the latter has successive saucers and funnels G G', all arranged substantially as and for the purpose specified.

EDWIN W. JOHNSON.

Witnesses:
 THOMAS WINSTON,
 MARTIN V. SALTZMAN.